United States Patent Office 3,541,385
Patented Nov. 17, 1970

3,541,385
EFFICIENT PRECISION SWEEP CIRCUIT
Ronald Richard Rothermel, Granada Hills, Calif., assignor to International Telephone and Telegraph Corporation, New York, N.Y., a corporation of Delaware
Filed Mar. 3, 1969, Ser. No. 803,855
Int. Cl. H01j 29/76
U.S. Cl. 315—27    10 Claims

ABSTRACT OF THE DISCLOSURE

The invention includes a linear, low-power, horizontal sweep circuit for a television camera tube having a pair of series-connected deflection coils. An electronic servo is employed to maintain the coil current linear with respect to time during the sweep. The servo output is rendered ineffective by switching it off during retrace. A capacitor then stores the energy of the coils and returns it to the coils with a reverse current. When the reverse current is at maximum, the retrace is terminated and the sweep begins again. The re-use of the energy stored in the coils, thus, reduces the power requirements of the circuit.

BACKGROUND OF THE INVENTION

This invention relates to sweep circuits for cathode-ray tubes or the like, and more particularly, to a sweep circuit which conserves the energy stored in the magnetic deflection coils employed with such tubes.

Although the device of the present invention will have many applications other than those disclosed herein and, therefore, should not be limited to those specific embodiments which are shown or described, the invention has been found to be especially useful in sweep circuits for any type of device which requires the use of magnetic deflection coils. For example, the invention may be employed as a linear, low-power, horizontal sweep circuit for the magnetic deflection coils of a television camera tube.

In the past, it has been the practice to drive a pair of deflection coils in series with an approximately rectangular or trapezoidal voltage pulse to create a substantially linear sawtooth current or magnetic field in the coils. The field, thus, increases linearly with time during sweep intervals of time. However, it has been difficult in the prior art to achieve a field of good linearity and stability using a feedback control system, while at the same time, using relatively low power.

SUMMARY OF THE INVENTION

In accordance with the present invention, the above-described and other disadvantages of the prior art are overcome by providing a unique combination of switching and drive circuitry. The invention combines a commonly used energy retrieval technique (commonly used in scan generators not employing feedback control) including a capacitor to store the energy in a pair of series-connected, magnetic deflection coils and then to return the stored energy to the coils with a reverse current. In effect, the capacitor takes the energy out of the coils beginning with a maximum current in one direction and then returns it to the coils ending with a maximum current in the opposite direction. The capacitor and coils simply act as a high-quality, tuned circuit which rings for one-half cycle during retrace. Thus, during retrace, the current in the coils is substantially one-half of a sine wave which begins at a maximum in one direction and terminates at a maximum in the opposite direction. A synchronized electronic switch is employed to make the tuned circuit ring. Thus, the energy storage conserves power.

In accordance with another feature of the invention, an electronic servo is employed to control coil current or field during the sweep. The servo is rendered ineffective during retrace.

Conventional scan generators not employing feedback control generally use a mechanism requiring drive power for only about one-half of the scan cycle (sometimes more than half a cycle of drive power is required, depending on the amount of energy which is lost and not retrievable for useful purposes during the drive portion of the cycle). The energy imparted to the coil during the drive portion of the cycle is used to perform the retrace and a good portion of the trace, depending on the recovery efficiency. This invention also utilizes the same technique but with one distinct advantage: During the trace portion of the cycle, feedback control is used to control the scan flux. The use of feedback control may make it possible to do away with the linearity control in most cases. Of course, the linearity control cannot be eliminated if it is desired to obtain greater linearity than that which would be obtainable from the deflection coil when driven by a hypothetical perfect generator. The use of feedback control also makes it unnecessary to use adjustable harmonic correction or other extraneous circuitry required to linearize sweep currents in generators not employing feedback control.

The above-described and other advantages of the present invention will be better understood from the following description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENTS

Figure 1:
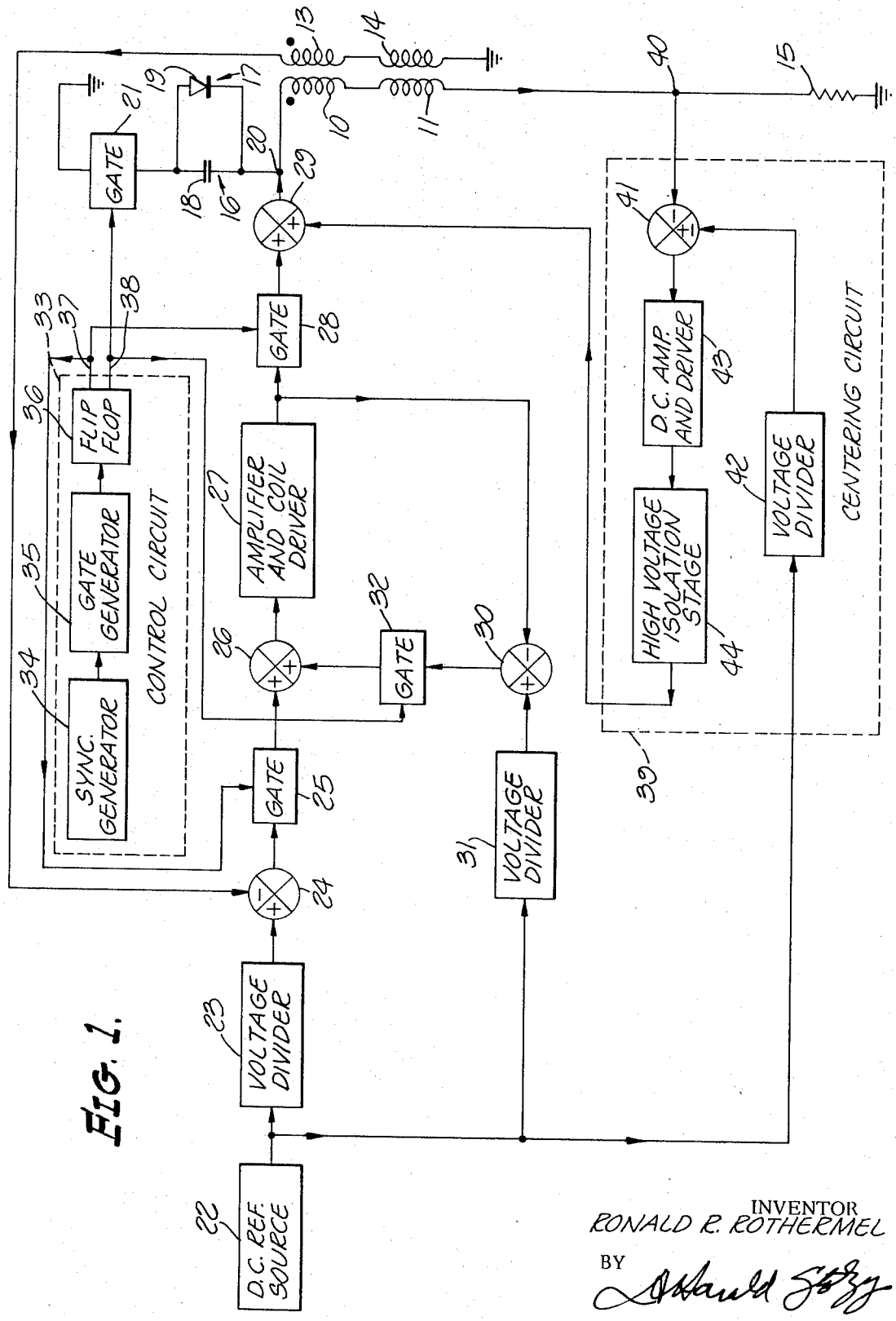
FIG. 1 is a block diagram of one embodiment of the present invention.

In FIG. 1, the magnetic deflection coils of a television camera tube are indicated at 10 and 11. Colts 10 and 11 are windings on an air core. Also provided are pick-off windings 13 and 14 transformer coupled to coils 10 and 11. Note will be taken that windings 10 and 11 are connected in series. Similarly, windings 13 and 14 are connected in series. One side of coils 10 and 11 are connected to ground through a resistor 15. One side of windings 13 and 14 are connected directly to ground.

The side of windings 13 and 14 which are shown connected to ground could be connected elsewhere in other configurations, e.g., these coils may be connected in series with the scaled reference voltage. In so doing, the coil output is algebraically summed (see summing junction 24) with the scaled reference to provide the difference—error voltage—for the amplifier (see 27 of FIG. 1).

First and second auxiliary circuits 16 and 17, respectively comprise a capacitor 18 and a diode 19. Capacitor 18 and diode 19 are connected in parallel with coils 10 and 11 from a junction 20 therewith to ground through a gate 21.

It is capacitor 18, along with whatever stray and deflection coil winding capacities, that store the energy of coils 10 and 11 during retrace and return this energy to coils 10 and 11 with a reverse current immediately prior to the beginning of a trace interval of time.

Coils 10 and 11 are driven and gated by the arrangement shown in FIG. 1. This arrangement includes a successive set of components connected from a DC reference source 22 to junction 20. The succession of components includes a voltage divider 23, a subtractor 24, a gate 25, an adder 26, an amplifier and coil driver 27, a gate 28, and an adder 29.

Windings 13 and 14 are connected from ground to subtractor 24. A subtractor is provided at 30. Subtractor 30 is connected from source 22 through a voltage divider 31. The output of amplifier 27 is also connected to subtractor 30. Adder 26 receives an input from subtractor 30 through a gate 32. All the gates 21, 25, 28, and 32 are operated by a control circuit 33.

FIG. 1 shows two out-of-phase outputs from the control circuit. Alternatively, field effect transistor switches can automatically accomplish the phase reversal for gates 25 and 32; and phase inversion could be made inherent in gates 28 and 21. In such cases, only one output need come from the control circuit.

Control circuit 33 includes a sync. generator 34 having a gate generator 35 and flip-flop 36 connected in succession therefrom. Sync. generator 34 produces output pulses at the beginning and the end of trace intervals. Different pairs of the same pulses define the beginning and the end of retrace intervals of time. Gate generator 35 operates flip-flop 36 to produce a high output voltage on an output lead 37 during trace intervals of time and a high output on lead 38 during retrace intervals of time. For this reason, control circuit 33 closes gates 25 and 28 simultaneously. At the same time that gates 25 and 28 are closed, control circuit 33 maintains gates 21 and 32 open. The reverse is also true. That is, control circuit 33 maintains gates 25 and 28 open when gates 21 and 32 are closed. Thus, gates 25 and 28 are closed during trace intervals and open during retrace intervals. Gates 21 and 32 are closed during retrace intervals and open during trace intervals.

A centering circuit 39 is connected from a junction 40 between coil 11 and resistor 15 to adder 29. Junction 40 is connected to an adder-subtractor 41. Adder-subtractor 41 also receives an input from source 22 through voltage divider 42. An amplifier 43 and a high voltage isolation stage 44 are connected in succession from adder-subtractor 41 to adder 29. Stage 44 is simply an inductor which has an inductance very large in comparison to the inductance of coils 10 and 11.

Figure 2:
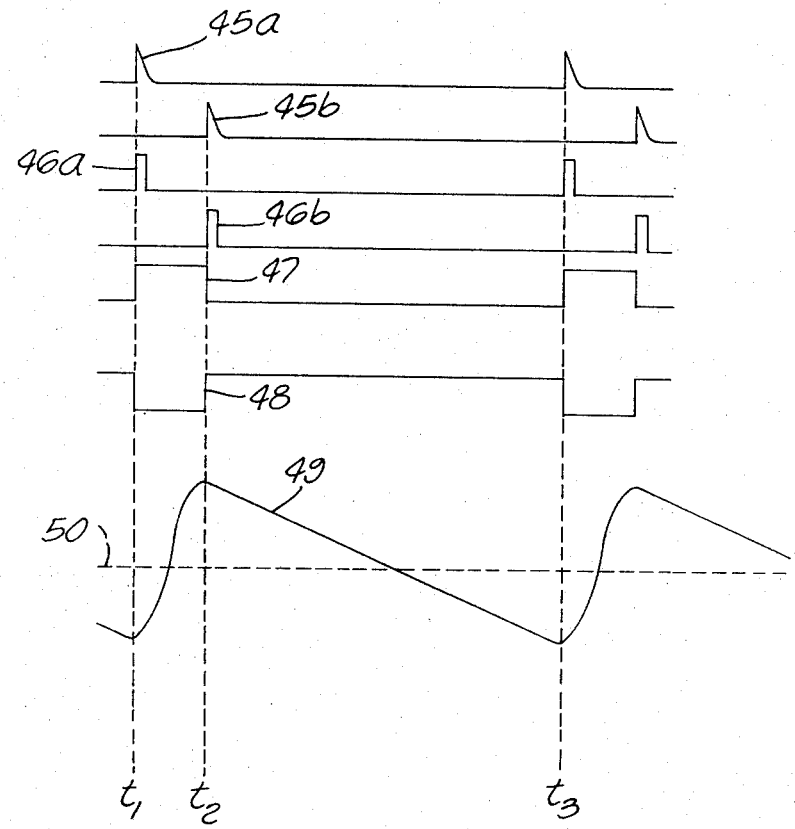
FIG. 2 is a graph of a group of waveforms characteristic of the operation of the invention.

Waveforms characteristic of the operation of the invention are shown in FIG. 2. The output pulses of sync. generator 34 are indicated by waveforms 45, 45a, and 45b. The output of gate generator 35 is indicated by waveforms 46, 46a, and 46b. The output of flip-flop 36 on lead 38 is indicated at 47. The output of flip-flop 36 on lead 37 is indicated at 48. The voltage drop across resistor 15 in FIG. 1 is shown at 49 in FIG. 2.

If the capacitance of the capacitor 18 is properly selected, the shape of waveform 49 between time, $t_1$ and time, $t_2$, will be that of one-half cycle of a sine wave, waveform 49 otherwise decreasing linearly during the trace interval between times $t_2$ and $t_3$. The time interval between $t_1$ and $t_2$ is the retrace interval. Zero voltage is indicated at 50. If the resistance in series with coils 10 and 11, including resistor 15, is quite small and the inductance of coils 10 and 11 is quite large, the first one-half of the period between $t_1$ and $t_2$ will be approximately the same in amplitude as that during the last one-half of the retrace interval. Some finite losses due to eddy currents, hysterisis, and the resistance in series with and the series resistance of coils 10 and 11 perform a damping function which causes any irregularities in coil current during starting conditions to quiet down rapidly.

The series resistance and other reflected losses (due to eddy currents, etc.) can be lumped together and thought of as having an equivalent coil shunt or series resistance which must be less—preferably much less—than the reactance of the coil's inductance at the frequency of retrace (ringing frequency). For relatively high retrace frequencies, care must be taken to insure low eddy current losses if power is a prime consideration.

Note will be taken that for the desirable performance of the invention, the circuit including coils 10 and 11 and capacitor 18 should ring at a frequency, $f$, given by the following equation:

$$f = \frac{1}{2T} \quad (1)$$

where T is the retrace time interval.

The ringing frequency as a function of coil inductance, L, and the capacitance, C, of capacitor 18 is given by the following:

$$f \cong \frac{1}{2\pi\sqrt{LC}} \quad (2)$$

where $\pi$ is 3.1416.

Setting (1) equal to (2) and solving for C, the following is obtained.

$$C \cong \frac{T^2}{\pi^2 L} \quad (3)$$

Thus, Equation (3) gives the capacitance, C, of capacitor 18 which should be maintained in order to obtain a reverse in coil current within the retrace interval and without a substantial loss of coil energy. (The energy is fully transferred to the capacitor at about the time the coil current is zero and then back to the coils 10 and 11 at the end of the retrace interval.)

In the operation of the circuit shown in FIG. 1, the level of waveform 49 relative to zero voltage 50 in FIG. 2 may be adjusted by changing the setting of the voltage divider 42. Further, voltage dividers 23, 31, and 42 may all be adjustable potentiometers.

The purpose of the circuit shown in FIG. 1, including the voltage divider 31, subtractor 30, and gate 32, is to set the output of amplifier 27 during retrace to insure that the amplifier does not drift into or is not driven into saturation. In addition, by proper adjustment of voltage divider 31, amplifier 27 can be set, if desired, to the voltage which is ideally required at the end of retrace. The latter adjustment aids in minimizing switching transients and settling time.

In the operation of the circuit shown in FIG. 1, windings 13 and 14 produce an output voltage proportional to the rate of change of current in coils 10 and 11 or the rate of change of the deflection flux produced by coils 10 and 11. This voltage is compared in subtractor 24 to the regulated output voltage of voltage divider 23. Gate 25 impresses the difference or error on amplifier 27 through adder 26 when gate 25 is closed. In this case, gate 32 is open. Gate 28 then impresses the output of amplifier 27 on coils 10 and 11 through adder 29. Note will be taken that gates 25 and 28 are closed simultaneously.

At the end of the trace interval, gates 25 and 28 are open; and gates 21 and 32 are closed. The presetting circuit, including voltage divider 31, subtractor 30, and gate 32, then controls amplifier 27 through adder 26 to provide a proper output for the beginning of the next trace interval. At the same time, the voltage drop across resistor 15 follows the waveform 49 during the retrace interval between times $t_1$ and $t_2$ shown in FIG. 2.

Figure 3:
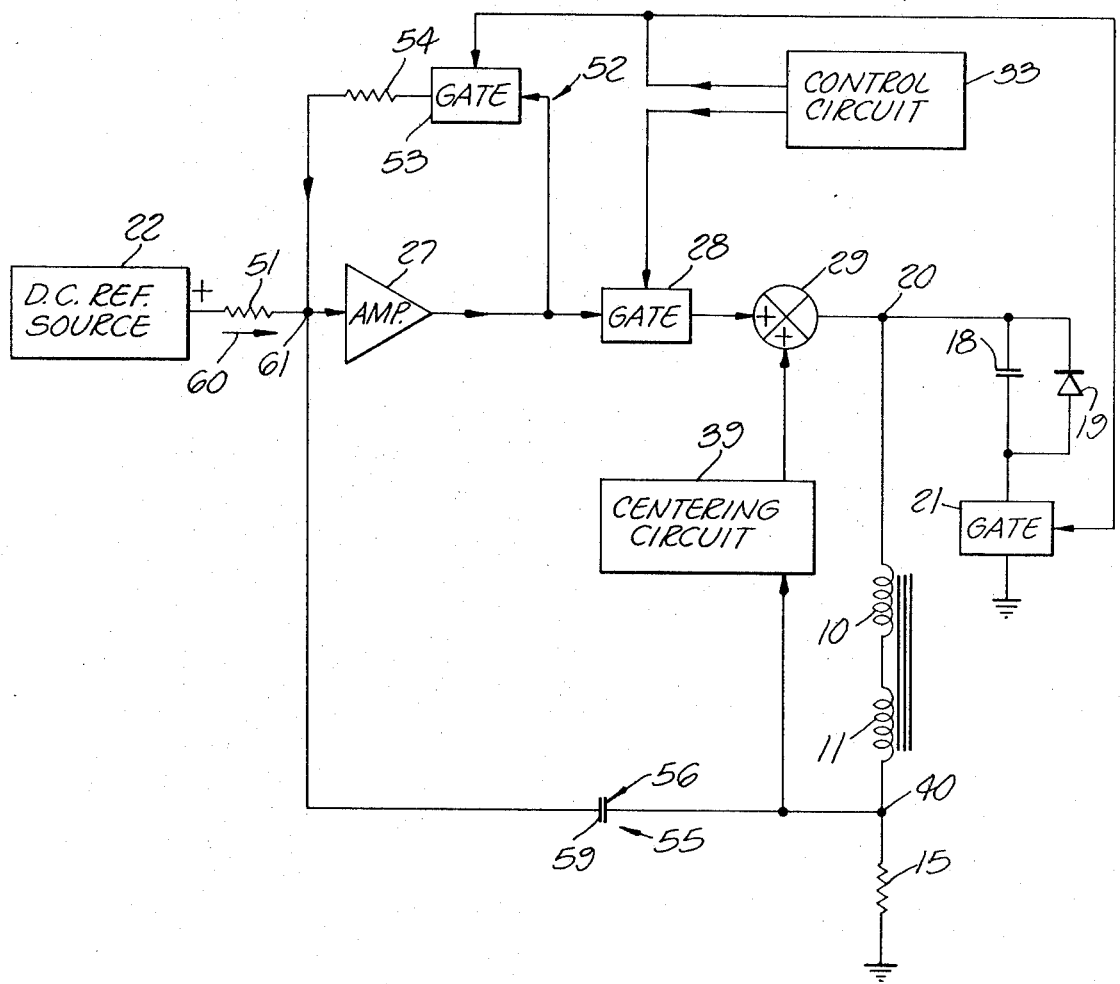
FIG. 3 is a block diagram of an alternate embodiment of the invention.

Another embodiment of the present invention is shown in FIG. 3. Note will be taken that certain components of the invention shown in FIG. 3 are identical to some of those shown in FIG. 1. Note will be taken that some of these components include amplifier 27, gate 28, adder 29, and resistor 15. All of the foregoing components shown in FIG. 3 and specifically enumerated are connected exactly the same way as they are in FIG. 1. Source 22 is also provided. However, source 22 is connected only to amplifier 27 and through a series resistor 51. Amplifier 27 has a first feedback circuit 52 including a series-connected gate 53 and a resistor 54. Amplifier 27 also has a second feedback circuit including a capacitor 56 connected from junction 40 to a junction 61.

In the operation of the circuit of FIG. 3, gate 28 is closed during the trace interval and open during the retrace interval. Gates 21 and 53 are closed during the retrace interval and open during the trace interval. All the gates shown in FIG. 3 are controlled by control circuit 33 as before.

In the operation of the circuit shown in FIG. 3, when gate 28 is closed and gates 21 and 53 are open, amplifier 27, having a substantial gain, drives its input virtually to ground through capacitor 56. The current in resistor 51 will flow in the direction indicated at 60—toward amplifier 27. This current input splits at junction 61, at the input of amplifier 27. Due to the fact that amplifier 27 has a substantial gain, the input thereof draws a negligible current. Further, the current through resistor 51 cannot flow through resistor 44 because gate 53 is open. The current in resistor 51, thus, must flow to and act as a charging current for capacitor 56.

As stated previously, due to the fact that junction 61 is virtually at ground, the current in resistor 51 and the charging of current of capacitor 56, therefore, must be constant. This establishes a voltage across capacitor 51 which linearly increases with time.

$$\frac{dv}{dt} = \frac{i_c}{c_1}$$

where $$\frac{dv}{dt}$$

is the rate of change of capactior voltage, $v$, with respect to time;
$i_c$ is the capacitor current; and
$c_1$ is the capacitor capacitance.

Since junction 61 is virtually at ground, the voltage across capacitor 56 appears across resistor 15. If the charging current of capacitor 56 is small in comparison to the coil currents, the amplifier 27, thus, will drive coil current linearly with time. The charging current of capacitor 56 may be made small in comparison to coil current by conventional circuit design.

During the retrace interval, the closure of gate 53 performs a function similar to the function of closure of gate 32. The closure of gate 53 simply sets the output of amplifier 27 to an appropriate value for the beginning of the trace interval. The closure of gate 21 during retrace causes the circuit including capacitor 18 and coils 10 and 11 to ring, as before.

It is not critical that the capacitance of capacitor 18 is exactly $$\frac{T^2}{\pi^2 L}$$

The invention will be useful so long as at least some energy lost by the coils to capacitor 18 is regained again with a reverse current.

Diode 19 may or may not be used depending on desired circuit stability and accuracy. It would only be required for cases where extreme stability were required. If it is used (this applies to both embodiments), capacitor 18 would be adjusted such that the coil voltage would complete the half cycle damped retrace in siglhtly less time than interval $t_2-t_1$. In this manner, diode 19 would clamp the coil to ground at the end of retrace and "hold" the voltage across the coil to near zero potential (thus holding the rate of change of coil current to nearly zero, momentarily) until gate 21 opens at time $t_2$. In this manner, diode 19 acts as a clamp, thereby minimizing the disturbance effect of slight changes or drifts in capacitor 18 and in the inductance of coils 10 and 11.

By proper design of amplifier 27, gate 21 could be simply replaced by two diodes connected "back-to-back" in series with capacitor 18 to adder 29 and junction 20. Of course in such case, diode 19 would necessarily have to be omitted to prevent short circuiting the negative swing of the output of the amplifier.

Centering circuit 39 may be modified if desired or omitted entirely. It could be as simple as a high voltage isolation inductor (to serve the function of adder 29 as well as high voltage isolation) connected in series with a potentiometer to a DC power source.

Note will be taken that in the embodiment shown in FIG. 3, resistor 15 is required. However, in the embodiment shown in FIG. 1, resistor 15 may be omitted if centering circuit 39 is omitted.

The gates shown in the drawings may be normally open or normally closed switches, with or without finite open or closed resistances. For example, each of the gates illustrated may or may not be a transistor or other electronic or other switch, as desired.

What is claimed is:

1. A sweep circuit comprising: a pair of series-connected, magnetic deflection coils; first and second auxiliary circuits connected in parallel with said coils, said first auxiliary circuit having two terminals and a capacitor in series between said terminals, said second auxiliary circuit being connected between said terminals, said second auxiliary circuit including a series-connected diode, said diode being poled in a direction which prevents it from being forward biased most of the time during each of a plurality of predetermined retrace intervals of time, a series-connected main gate in at least said second auxiliary circuit; a control circuit for opening said main gate during trace intervals of time which occur alternatively between said retrace intervals; and means for driving said coils in a manner to produce a magnetic field in said coils increasing in one direction during said trace intervals, said capacitance to receive the energy stored in said coils by said means and to return said energy to said coils with a reversed current in said coils during said retrace intervals.

2. The invention as defined in claim 1, wherein said capacitance is approximately equal to that given by the formula:

$$C = \frac{T^2}{\pi^2 L}$$

where C is said capacitance; T is one of said retrace intervals; $\pi$ is 3.1416; and L is the inductance of said coils.

3. The invention as defined in claim 1, wherein said means includes an auxiliary gate and an amplifier having its output connected to one side of said coils through said first auxiliary gate, said control circuit being adapted to close said auxiliary gate when said main gate is open and to open said auxiliary gate when said main gate is closed.

4. The invention as defined in claim 3, wherein said means includes means responsive to said control circuit to preset said amplifier during each retrace interval.

5. A sweep circuit comprising: a main circuit including a pair of series-connected, magnetic deflection coils; an auxiliary circuit connected in parallel with said main circuit, said auxiliary circuit including a main capacitor connected in series with a main gate; a control circuit for opening said main gate during a plurality of predetermined trace intervals of time and for closing said gate during a plurality of predetermined retrace intervals of time which occur alternately between said trace intervals; and means for driving said coils in a manner to produce a magnetic field in said coils increasing in one direction during said trace intervals, said capacitor having a capacitance to receive the energy stored in said coils by said means and to return said energy to said coils with a reverse current in said coils during said retrace intervals.

6. The invention as defined in claim 5, wherein said capacitance is approximately equal to that given by the formula:

$$C = \frac{T^2}{\pi^2 L}$$

where C is said capacitance; T is one of said retrace intervals; $\pi$ is 3.1416; and L is the inductance of said coils.

7. The invention as defined in claim 5, wherein said means includes an auxiliary gate and an amplifier having its output connected to one side of said coils through said first auxiliary gate, said control circuit being adapted to close said auxiliary gate when said main gate is open and to open said auxilary gate when said main gate is closed.

8. The invention as defined in claim 7, wherein said means includes means responsive to said control circuit to preset said amplifier during each retrace interval.

9. The invention as defined in claim 5, wherein said means includes a DC reference source, said means also including a main drive having a first voltage divider, a first subtractor, a first auxiliary gate, a first adder, an amplifier, a second auxiliary gate, and a second adder connected in succession, said main drive being connected from said source to one side of said coils, said coils having a pick-off winding, one side of said winding being grounded, the other side of said winding being connected to said first subtractor, a resistor connected from the other side of said coils to ground, a centering circuit connected from said other side of said coils to said second adder, a second subtractor, a third auxiliary gate, a second voltage divider connected from said source to said subtractor to said first adder throguh said third auxiilary gate, said control circuit being adapted to close said first and second auxiliary gates and to open said third auxiilary gate simultaneously when said main gate is opened, said control circuit being adapted to open said first and second auxiliary gates and to close said third auxiliary gate when said main gate is closed, said capacitance being approximately equal to that given by the formula:

$$C = \frac{T^2}{\pi^2 L}$$

where C is said capacitance; T is one of said retrace intervals; $\pi$ is 3.1416; and L is the inductance of said coils.

10. The invention as defined in claim 5, wherein said means includes a DC reference source, an ampilfier, a first resistor connected from said source to the input of said amplifier, an adder connected to one side of said coils, said main circuit including a second resistor connected from the other side of said coils to ground, a first auxiliary gate connected from the output of said amplifier to said adder, a first feedback circuit connected from the output of said amplifier to the input thereof, said first feedback circuit including a series-connected resistor and a second auxiliary gate, a second feedback circuit connected from the input of said amplifier to said other side of said coils, said second feedback circuit including an auxiliary capacitor having one side connected from said amplifier to said other side of said coils, a centering circuit connected from said other side of said coils to said adder, said control circuit being adapted to close said first auxiliary gate and to open said second auxiliary gate when said main gate is open, said control circuit being adapted to open said first auxiliary gate and to close said second auxiliary gate when said main gate is closed, said capacitance being approximately equal to that given by the formula:

$$C = \frac{T^2}{\pi^2 L}$$

where C is said capacitance; T is one of said retrace intervals; $\pi$ is 3.1416; and L is the inductance of said coils.

References Cited
UNITED STATES PATENTS

| | | | |
|---|---|---|---|
| 3,323,001 | 5/1967 | Mackezlar | 315—27 |
| 2,896,115 | 7/1959 | Guggi | 315—27 |
| 3,235,766 | 2/1966 | Martin | 315—27 |

RODNEY D. BENNETT, JR., Primary Examiner

J. G. BAXTER, Assistant Examiner

U.S. Cl. X.R.

315—29